Nov. 10, 1964 M. M. DORSEY Re. 25,683

CRUSHER BOWL LOCKING MEANS

Original Filed July 29, 1958 3 Sheets-Sheet 1

INVENTOR.
MERCER M. DORSEY
BY

McMorrow, Berman + Davidson
ATTORNEYS

CRUSHER BOWL LOCKING MEANS

Original Filed July 29, 1958 3 Sheets-Sheet 2

Fig. 8-A

INVENTOR.
MERCER M. DORSEY
BY
McMorrow, Berman & Davidson
ATTORNEYS

CRUSHER BOWL LOCKING MEANS

Original Filed July 29, 1958 3 Sheets-Sheet 3

INVENTOR.
MERCER M. DORSEY
BY
McMorrow, Berman & Davidson
ATTORNEYS

United States Patent Office

Re. 25,683
Reissued Nov. 10, 1964

25,683

CRUSHER BOWL LOCKING MEANS

Mercer M. Dorsey, Ajo, Ariz., assignor to Nordberg Manufacturing Company, Milwaukee, Wis., a corporation of Wisconsin Original No. 2,972,448, dated Feb. 21, 1961, Ser. No. 751,784, July 29, 1958. Application for reissue Jan. 25, 1963, Ser. No. 254,034
3 Claims. (Cl. 241—286)

Matter enclosed in heavy brackets [ ] appears in the original patent but forms no part of this reissue specification; matter printed in italics indicates the additions made by reissue.

The present invention relates to a releasable [pressure-applying mechanism for a bolt and nut assembly] *crusher bowl locking means.*

An object of the present invention is to provide a mechanism which lends itself to applying pressure to a bolt and nut assembly used in a cone ore crusher to secure the concave elements which support the stationary mantle above the gyratory cone of the crusher, and one which is quickly releasable so that the concave element may be rapidly shifted relative to the cone.

*Another object of this invention is to provide a releasable fluid locking arrangement for the bowl of a cone crusher.*

Another object of the present invention is to provide a releasable pressure-applying mechanism for a bolt and nut assembly used in a cone ore crusher to secure the concave element relative to the gyratory cone of the crusher which is efficient in action, one which may be operated with a minimum of labor and time, and one which is economically feasible.

These and other objects and advantages of the present invention will be fully apparent from the following description when taken in connection with the annexed drawings, in which:

FIGURE 8a is a sectional view taken on the line 8a—8a of FIGURE 8.

Figure 1:
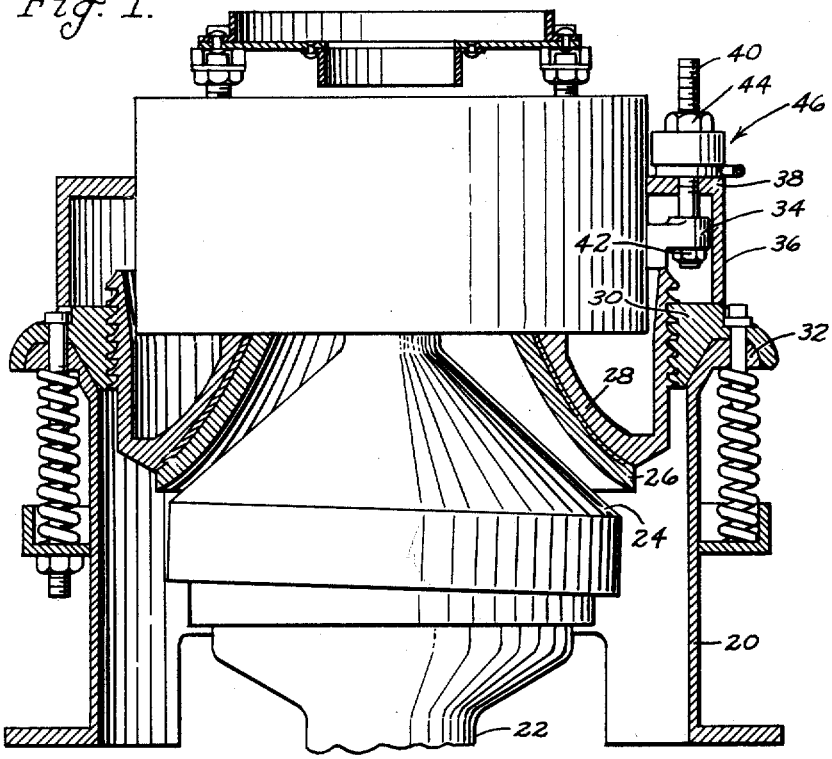
FIGURE 1 is an elevational view of a gyratory cone crusher for ore, with the mechanism of the present invention installed thereon.

Referring in greater detail to the drawings in which like numerals indicate like parts throughout the several views, in FIGURE 1 the reference numeral 20 indicates an upstanding frame member of a cone or crushing apparatus having a cylinder 22 in which is housed the gyratory motion producing mechanism for the crushing cone 24 which is positioned within the frame 20. A crushing mantle 26 is held stationary above the cone 24 on the underside of a concave supporting element 28 positioned within and threadedly attached to a supporting ring 30. The ring 30 is carried by an outwardly projecting flange 32 on the upper end of the frame member 20.

A plurality of threaded lugs 34 project in spaced relation from the outer periphery of the concave supporting element 28, the bore through each lug 34 extending vertically. A guard 36, of L-shaped cross-sectional configuration, is positioned in inverted superimposed relation with respect to the ring 30 and is freely movable therearound with the long leg resting upon the ring 30. The short leg serves as a shelf 38, annular in form, superimposed in spaced relation with respect to the lugs 34 and carried by the ring 30.

An upstanding stud 40 extends through each lug 34 and through the adjacent portion of the shelf 38 and is in threaded engagement with the lug 34. The portion of each stud 40 adjacent the upper end projects beyond and above the shelf 38. A lock nut 42 is threadedly engaged on the lower end portion of each stud 40 for securing the latter against rotation within the respective lug 34.

A nut 44 is in threaded engagement with a projecting portion of each of the studs 40, each nut 44 being spaced above the shelf 38.

The components of the cone or crushing apparatus, as above described, are conventional and the nut 44 on each stud 40 is normally in abutting engagement with the top surface of the adjacent portion of the shelf 38. Disposed between the nut 44 and the shelf 38 is a pressure-applying mechanism which constitutes the present invention and which is designated by the numeral 46. The tightening of the nuts 44 serves to secure the threaded upright portion of the concave supporting element 28 to the ring 30 against relative movement therebetween.

In the past, with the pressure-applying mechanism 46 omitted, when it was desired to adjust the mantle 26 relative to the upper surface of the cone 24, it was necessary to loosen each nut 44 so that the concave element 28 could be rotated in its threaded engagement with the threaded portion of the ring 30 for up and down movement relative to the cone 24. This in the past was a tedious operation requiring that the operation of the crusher be stopped for a period of time.

Other means have been provided for securing the concave element 28 to the ring 30 and such means has employed studs which are slotted with appropriately sized and shaped wedges engaging in the slots of the studs to hold the shelf in the position toward the lugs. The removal of such wedges entails a loss of operating time for the crusher and frequently created a hazard from the flying wedges as they were knocked from their respective studs. The present invention consists in an improvement to such a cone or crushing apparatus and consists in a releasable pressure applying mechanism interposed between the nut 44 of each stud 40 and the adjacent portion of the shelf 38.

The pressure applying mechanism of the present invention designated in FIGURE 1 by the numeral 46 comprises, FIGURES 3 to 6, a pair of abutment elements 48 and 50 connected together for movement toward and away from each other. The mechanism 46 is positioned so that the abutment elements 48 and 50 surround the portion of each stud 40 between the adjacent nut 44 and the adjacent portion of the shelf 38 with one of the abutment elements, the upper one 48, bearing against the nut 44 and the other or lower abutment element 50 bearing against the adjacent portion of the shelf 38.

Figure 4:
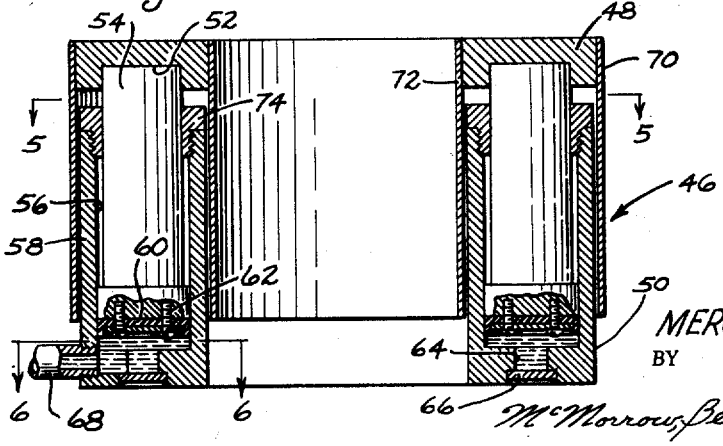
FIGURE 4 is a sectional view in elevation of the mechanism shown in FIGURE 3.

As will be seen in FIGURE 4, the pressure applying means within the mechanism 46 consists in a plurality of fluid operated hydraulic cylinder assemblies with the abutment element 48 in the form of a ring having spaced recesses 52 each receiving the upper end of a piston 54 slidable in a bore 56 provided in a cylinder 58 rising from the abutment element 50. The lower end of each piston 54 carries a sealing element 60 fixed thereto by means of cap screws 62. The abutment element 50 is provided with a circular channel, shown in dotted lines in FIGURE 6 and designated by the reference numeral 64, closed on its lower end by a sealing member 66 (FIGURE 4) and forming a conduit connecting all of the bores 56 together. A conduit 68 is threaded in the side of the element 50 and is connected in communication with a channel 64. A source of fluid under pressure (not shown) is connectable to the conduit 68 for raising the abutment member 48 relative to the element 50 and to thereby secure and lock the concave supporting element 28 to the ring 30 as a result of the securing pressure against the nut 44 and the adjacent portion of the shelf 38.

An outer sleeve 70 and an inner sleeve 72, FIGURE 4, depend from the ring-shaped abutment element 48 and serve as guides for the movement of the element 48 relative to the element 50. The upper end of each cylinder 58 is closed by a nut 74 through which slides the piston 54.

Figure 2:
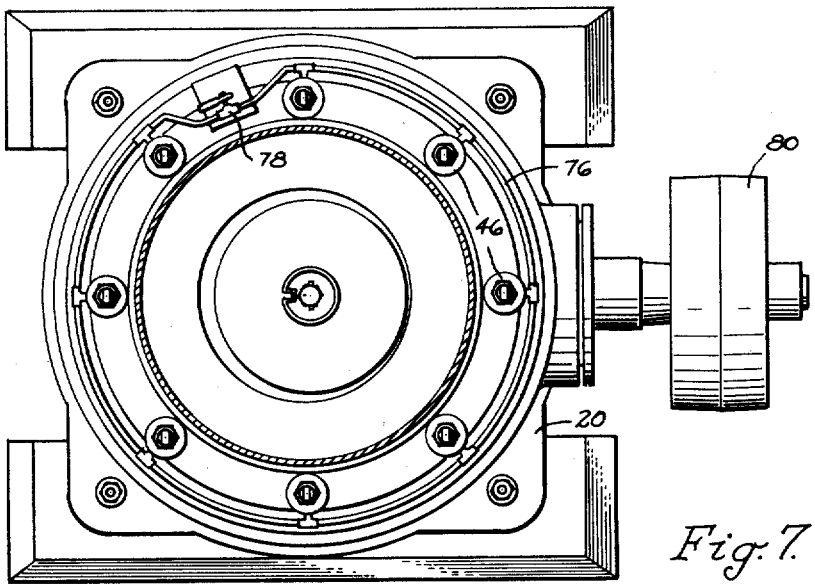
FIGURE 2 is a plan view of the assembly shown in FIGURE 1.

In FIGURE 2 it will be seen that there are a plurality, eight in number, of the mechanisms 46 arranged in spaced relation and all connected together by a single conduit 76 which leads to a valve assembly 78 for controlling the admission of hydraulic fluid into each of the cylinders 58 simultaneously. In FIGURE 2 the reference numeral 80 indicates the driving pulley for the cone or crusher.

Figure 7:
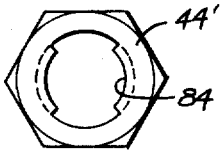
FIGURE 7 is a plan view of one of the nuts used with the cone crusher.
Figure 8:
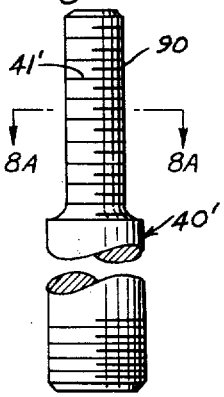
FIGURE 8 is an elevational view with a part broken away of one of the studs used in the cone crusher.
Figure 8:
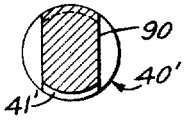
Figure 5:
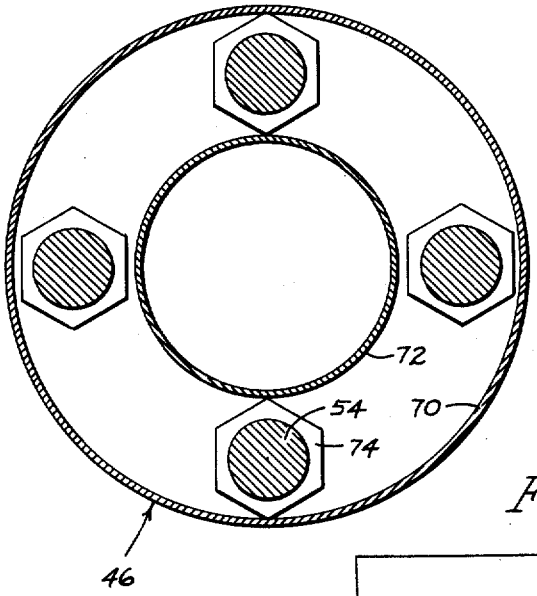
FIGURE 5 is a sectional view taken on the line 5—5 of FIGURE 4.
Figure 6:
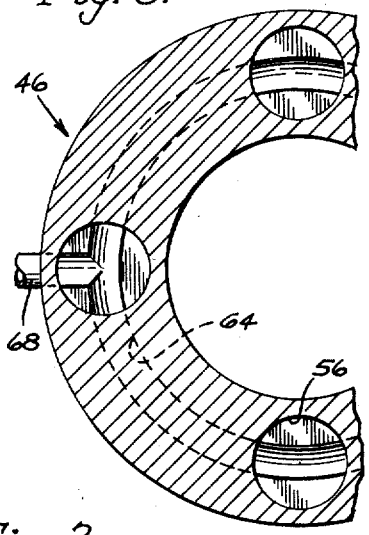
FIGURE 6 is a fragmentary sectional view, taken on the line 6—6 of FIGURE 4.
Figure 3:
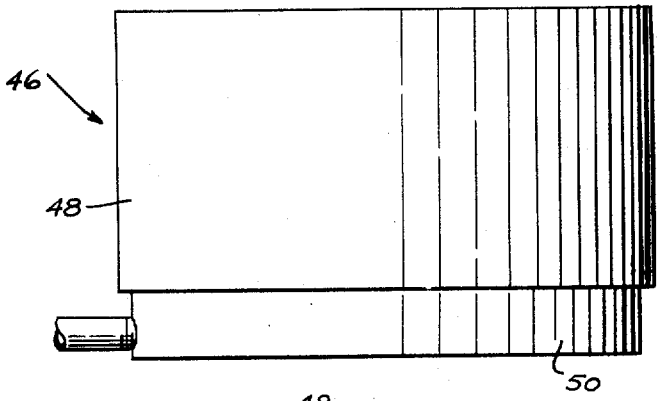
FIGURE 3 is an elevational view, on an enlarged scale, of the mechanism shown in FIGURES 1 and 2.

In FIGURE 7 is shown a nut 44′ which is adaptable for use with each mechanism 46, such as nut 44′ being provided with broken threads 84. In FIGURE 8 a stud 40′ is shown which is adaptable for use with the nut 44′, such stud 40′ being provided with opposed flat surfaces as at 90, FIGURE 8a. In use of the nut 44′ and the stud 40′, the nut 44′ is applied to the stud 40′ so that the flat surfaces 90 of the stud are in registry with the broken threads 84 of the nut 44′ and the nut 44′ is then slid along the stud 40′ the desired distance, whereupon a quarter turn applied to the nut 44′ causes the broken threads 84 of the nut 44′ to threadedly engage the broken threads 41′ on the stud 40′.

Figure 9:
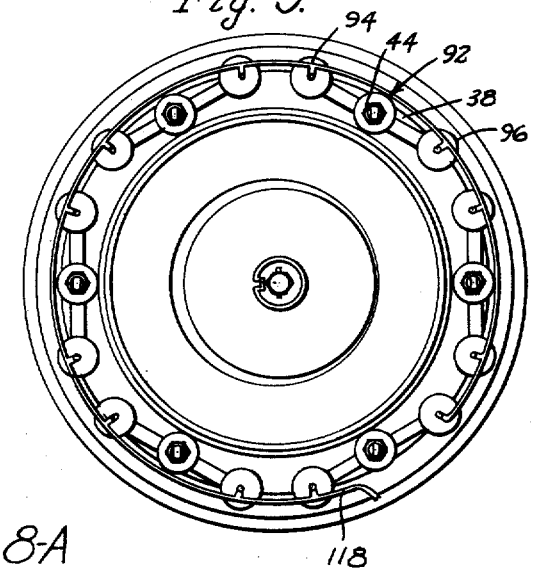
FIGURE 9 is a plan view of a portion of the crusher shown in FIGURE 2, with a modified form of the present invention installed thereon.

In FIGURE 9 is shown a modified form of the means for applying pressure to the nuts 44 and adjacent portions of the shelf 38 of the ore crusher, such pressure applying mechanism being designated generally by the reference numeral 92 and including a pair of air cylinders 94 and 96 arranged on each side of each mechanism 92.

Figure 11:
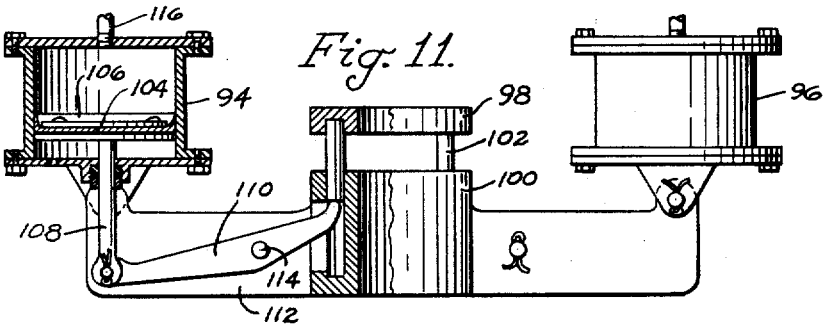
FIGURE 11 is a sectional view, on an enlarged scale, taken on the line 11—11 of FIGURE 10.
Figure 10:
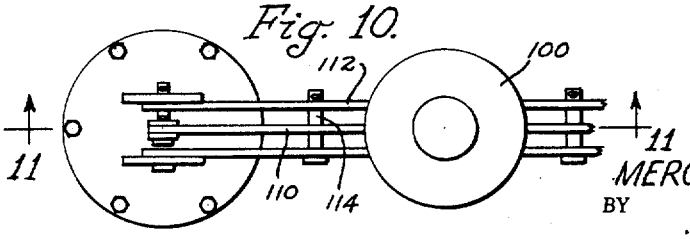
FIGURE 10 is a fragmentary plan view of a portion of the assembly shown in FIGURE 9.

The mechanism 92 is shown in FIGURES 10 and 11 and comprises an upper abutment member 98 and a lower abutment member 100 connected together by sliding pins 102 dependingly carried by the member 98. The structure of each air cylinder 94 and 96 is identical and will be described, together with its connection to the abutment member 98 with reference to the air cylinder 94.

A piston 104 within each air cylinder 94 carries a sealing member 106 and is connected by a piston rod 108 to one end of a rocking lever 110. An arm 112 projects outwardly from the lower abutment member 100 and forms a support for a pivot pin 114 carrying the lever 110. The inner end of the lever 110 bears against the underside of the adjacent pin 102 and effects the upward movement of the member 98 upon the admission of air into the cylinder 94 through the inlet conduit 116.

The abutment members 98 and 100 or the form of FIGURES 10 and 11 are ring-shaped and surround the portion of each stud 40 between the adjacent nut 44 and the adjacent portion of the shelf 38 with one of the abutment members or elements, the upper one 98, bearing against the nut 44 and the other abutment member or element 100 bearing against the adjacent portion of the shelf 38.

In FIGURE 9 it will be seen that a supply conduit 118 connects the air cylinders 94 and 96 of each mechanism 92 together. Upon admission of air into the associated air cylinders, the releasable pressure applying means is actuable to direct securing pressure against the nut 44 and the adjacent portion of the shelf 38 for locking the concave supporting element 28 to the supporting ring 30 and being actuable upon release to relieve such securing pressure against the nut and shelf and permit movement of the concave supporting element 28 relative to the ring 30 for adjustment of the mantle 26 toward and away from the cone 24.

In operation, assuming that the concave supporting element 28 has been rotated in the threaded supporting ring 30 to the set position and the nuts 44 turned down tightly against the upper abutment elements 48 or 98 of the pressure applying mechanisms 46 or 92, and play appears between the nuts 44 and the upper abutment elements 48 or 98, due to any wear between the nuts 44 and studs 40, the nuts 44 are turned down tightly against the upper abutment elements 48 or 98, whereupon air is admitted to the cylinders of the pressure applying mechanisms 46 or 92 to move the upper abutment elements 48 or 98 away from the lower abutment elements 50 or 100 and thereby apply pressure to both the shelves 38 and the nuts 44 and pull the threads on the concave supporting element 28 into tight threaded engagement with the ring 30. Should it be desired to change the setting of the mantle 26 relative to the cone 24, the air pressure is released from the cylinders of the pressure applying mechanisms 46 or 92 enabling the upper abutment elements 48 or 98 to move toward the lower abutment elements 50 or 100, the nuts 44 reversely turned the desired degree, and the concave supporting element 28 rotated in the supporting ring 30 the desired extent, whereupon the nuts 44 are turned down tightly against the upper abutment elements 48 or 98 followed by admission of air to the cylinders of the pressure applying mechanisms 46 or 92 to move the upper abutment elements 48 or 98 away from the lower abutment elements 50 or 100 and thereby apply pressure to both the shelves 38 and the nuts 44 and pull the threads on the concave supporting element 28 into tight threaded engagement with the ring 30.

In each of the forms of the invention, the pressure applying means associated with each mechanism is fluid operated.

While only preferred embodiments of the present invention have been shown and described, other embodiments are contemplated and numerous changes and modifications may be made therein without departing from the spirit of the invention as set forth in the appended claims.

What is claimed is:

1. In a cone ore crushing apparatus including an upstanding frame member having an outwardly projecting flange on the upper end thereof, a supporting ring carried by said flange, a concave supporting element positioned within said ring and threadedly attached to said ring, a plurality of threaded lugs projecting in spaced relation from the outer periphery of said concave element, an annular shelf superimposed in spaced relation with respect to said lugs and carried by said ring, an upstanding stud extending through each lug and the adjacent portion of said shelf and in threaded engagement with said lug and having the portion adjacent the upper end projecting beyond said shelf, and a nut in threaded engagement with the projecting portion of each of said studs, the nut being spaced above said shelf, the improvement comprising a releasable pressure applying mechanism interposed between the nut of each stud and the adjacent portion of said shelf, said mechanism being actuable to direct securing pressure against said nut and said shelf for locking said concave element to said supporting ring and being actuable upon release to relieve the securing pressure against said nut and said shelf and permit movement of said concave element relative to said ring.

2. In a cone ore crushing apparatus including an upstanding frame member having an outwardly projecting flange on the upper end thereof, a supporting ring carried by said flange, a concave supporting element positioned within said ring and threadedly attached to said ring, a plurality of threaded lugs projecting in spaced relation from the outer periphery of said concave element, an annular shelf superimposed in spaced relation with respect to said lugs and carried by said ring, an upstanding stud extending through each lug and the adjacent portion of said shelf and in threaded engagement with said lug and having the portion adjacent the upper end projecting beyond said shelf, and a nut in threaded engagement with the projecting portion of each of said studs, the nut being spaced above said shelf, the improvement comprising a releasable pressure applying mechanism including a pair of abutment elements connected together for movement toward and away from each other, and pressure applying means operatively connected to said abutment elements for effecting the movements of said abutment elements, said mechanism being positioned so that the abutment elements surround the portion of each stud between the adjacent nut and the adjacent portion of said shelf with one of the abutments bearing against said nut and the other of the abutment elements bearing against the adjacent portion of said shelf, said abutment elements being actuable to direct securing pressure against said nut and said shelf for locking said concave element to said supporting rings and being actuable upon release to relieve the securing pressure against said nut and said shelf and permit movement of said concave element relative to said ring.

*3. In a gyratory crusher, a circumferential main frame, a supporting ring releasably mounted on the main frame, a concave supporting element screw-threaded into the supporting ring and adapted to be rotated therein, a cone*

*mounted in the frame for gyratory movement defining a crushing cavity with the concave supporting element, rotation of the concave supporting element being effective to vary the size of the crushing cavity, an annular top enclosure connected to the concave supporting element to rotate therewith and supported on the supporting ring, the enclosure having a generally horizontal upper shelf spaced above the supporting ring, a plurality of fluid operated pressure applying piston and cylinder assemblies spaced about the crusher and mounted on the top enclosure to rotate therewith above the concave supporting element and supporting ring, the cylinders of the assemblies being mounted on and extending above the shelf, means extending through the shelf and operatively connected to the concave supporting element and the pistons so that the assemblies are effective to apply a generally vertical thrust, as a group, upward on the concave supporting element and downward on the supporting ring through the top enclosure to remove thread clearance between the concave supporting element and supporting ring, and conduit means connecting said pressure applying assemblies to a common pressure fluid source.*

References Cited by the Examiner

The following references, cited by the Examiner, are of record in the patented file of this patent or the original patent.

UNITED STATES PATENTS

| | | | |
|---|---|---|---|
| 1,868,338 | 7/32 | Symons | 241—215 |
| 2,556,641 | 6/51 | Bakewell | 241—307 X |
| 2,679,984 | 6/54 | Gruender | 241—215 X |
| 2,680,571 | 6/54 | Bjarme | 241—215 X |
| 2,687,257 | 8/54 | Rumpel | 241—215 |
| 2,791,383 | 5/57 | Kjelgaard | 241—207 X |

J. SPENCER OVERHOLSER, *Primary Examiner.*

EDWARD J. MICHAEL, JOHN C. CHRISTIE, *Examiners.*